United States Patent
Balachandran

(10) Patent No.: US 12,137,154 B2
(45) Date of Patent: Nov. 5, 2024

(54) MANAGING DEPLOYMENT OF CLOUD-NATIVE NETWORK FUNCTIONS (CNFS)

(71) Applicant: VMware LLC, Palo Alto, CA (US)

(72) Inventor: Vipin Balachandran, Cupertino, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/156,555

(22) Filed: Jan. 19, 2023

(65) Prior Publication Data

US 2023/0239374 A1 Jul. 27, 2023

Related U.S. Application Data

(60) Provisional application No. 63/301,872, filed on Jan. 21, 2022.

(51) Int. Cl.
*G06F 16/23* (2019.01)
*G06F 16/958* (2019.01)
*H04L 67/5682* (2022.01)

(52) U.S. Cl.
CPC ........ *H04L 67/5682* (2022.05); *G06F 16/972* (2019.01)

(58) Field of Classification Search
None
See application file for complete search history.

(56) References Cited

U.S. PATENT DOCUMENTS

| | | | |
|---|---|---|---|
| 2007/0073671 A1* | 3/2007 | McVeigh | G06F 16/93 |
| 2018/0025173 A1* | 1/2018 | Keyes | G06F 21/6218 726/4 |
| 2019/0339965 A1* | 11/2019 | Garvey | G06F 16/24578 |
| 2021/0263913 A1* | 8/2021 | Boodman | G06F 16/235 |
| 2021/0397712 A1* | 12/2021 | Gajananan | G06F 21/53 |

\* cited by examiner

*Primary Examiner* — Christopher B Robinson
(74) *Attorney, Agent, or Firm* — Quarles & Brady LLP

(57) ABSTRACT

Described herein are systems, methods, and software to manage new and updated containerized network functions (CNFs). In one implementation, a management service identifies a CNF in a first repository. Once identified, the management service identifies one or more configuration parameters associated with the CNF and updates one or more files for the CN with the one or more configuration parameters. The management service then stores at least the one or more files for the CNF in a second repository. In some implementations, the management service will monitor the first repository for modifications associated with the CNF and will update the files in the second repository based on the modifications.

20 Claims, 6 Drawing Sheets

MANAGING DEPLOYMENT OF CLOUD-NATIVE NETWORK FUNCTIONS (CNFS)

RELATED APPLICATIONS

This application hereby claims the benefit of and priority to U.S. Provisional Patent Application No. 63/301,872, titled "MANAGING DEPLOYMENT OF CLOUD-NATIVE NETWORK FUNCTIONS (CNFS)," filed Jan. 21, 2022, and which is hereby incorporated by reference in its entirety.

TECHNICAL BACKGROUND

Cloud-native network functions (CNFs) are a software-implementation of a network function that runs inside a container. CNFs can provide directory services, routers, firewalls, load balancers, and other similar network functions as containers across one or more host computing systems. These containers allow developers to package software (applications, functions, microservices, and the like) with all the files required to execute the software, while sharing the operating system and other resources of the host computing systems. Advantageously, containers can more efficiently use the resources of the host, while maintaining the security of separate namespaces.

However, while CNFs provide an efficient mechanism for deploying network functions in a computing environment, difficulties arise in managing changes to the CNF. These difficulties can include adapting a CNF package to be implemented in a new environment, making improvements or correcting issues in an existing function, or providing some other operation in association with the function.

SUMMARY

The technology described herein manages cloud-native network functions (CNFs) in a computing environment. In one implementation, a CNF management service identifies a committed change in one or more files associated with a CNF in a first repository. In response to identifying the changes, the CNF management service determines whether the committed change is permitted based on one or more policies associated with the CNF. When the committed change is not permitted, the CNF management service will prevent an update to one or more files in a second repository corresponding to the committed change. When the committed change is permitted, the CNF management service updates at least one file in the second repository based on the committed change.

DETAILED DESCRIPTION

Figure 1:
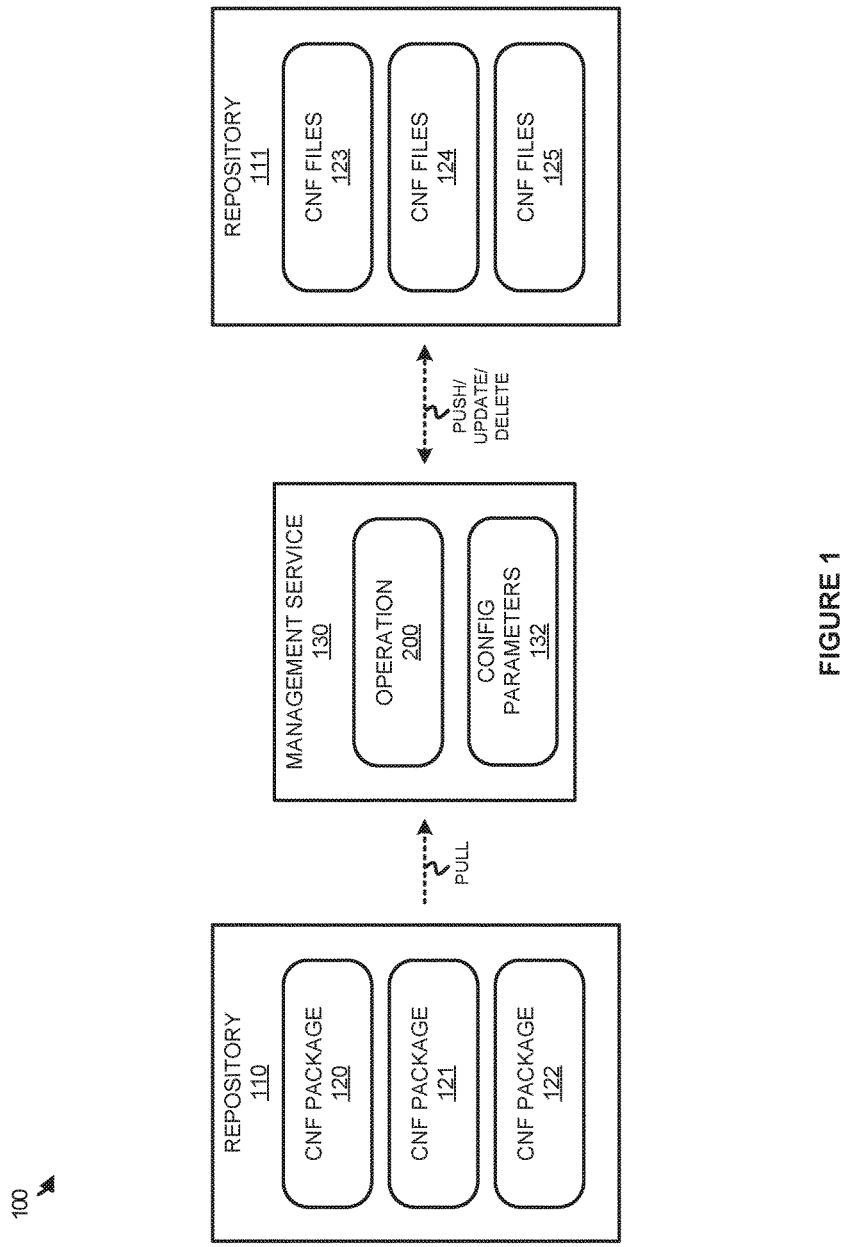
FIG. 1 illustrates a computing environment to manage versions of cloud-native network functions (CNFs) according to an implementation.

FIG. 1 illustrates a computing environment 100 to manage versions of cloud-native network functions (CNFs) according to an implementation. Computing environment 100 includes repositories 110-111 and management service 130. Repository 110 is representative of an upstream repository that includes CNF packages 120-122, wherein each of the packages may comprise a Helm chart in some examples. Repository 111 is representative of a downstream repository that includes CNF files 123-125 that correspond to single source of truth for a deployment environment. Management service 130 provides operation 200 that is further described below with respect to FIG. 2 and includes configuration parameters 132 that can transform files to apply to a deployment environment.

In computing environment 100, CNF packages 120-122 are added to an environment to implement various network functions. These network functions may include firewall services, routing services, load balancing services, or some other network service. CNFs are deployed as containers, wherein containers allow developers to package software (applications, functions, microservices, and the like) with all the files required to execute the software, while sharing the operating system and other resources of the host computing systems. Containers may provide a unique namespace to separate and secure the containers in some examples.

Here, repository 110 includes CNF packages 120-122, wherein CNF packages 120-122 may comprise Helm charts in some examples. The Helm charts are YAML file manifests combined into a single package that can be advertised to Kubernetes clusters. When packaged, a single helm install can be performed to make an application available within a cluster. The YAML files may comprise configuration files that can be used to configure an application when it is deployed within a cluster. Using an example of CMF package 120, when CNF package 120 is added to repository 110 and management service 130 is provided with a path to the package, management service 130 processes the package to determine whether any transformations are required in association with the files with CNF package 120 and stores the transformed files as CNF files 123 in repository 111. In some implementations, the transformations will include replacing, transforming, or adding values to one or more files from CNF package 120. In at least one example, management service 130 may identify processing requirements or configuration parameters associated with the package and update the files in the package to be supported in the deployment environment. In some examples, the transformation may identify the configuration parameters in the files and transform the files such that the CNF can be deployed within a deployment environment. For example, a file in CNF package 120 may indicate that the CNF is required to be deployed on hardware with solid-state storage. Management service 130 may identify the requirement and transform the file to correspond to the deployment environment, wherein the transformation may indicate available clusters to support the requirements of the CNF package. Once transformed, the files can be stored in repository 111 as CNF files 123, wherein the files may be used by continuous application deployments (CDs), such as Flux or Argo, to deploy the CNFs in a deployment environment.

In some implementations, changes or modifications can be made to CNF packages 120-122, wherein the modifications may be used to modify the files in the package, add or remove files from a package, or provide some other modification in association with a package. These changes may correspond to Git changes associated with the files, wherein Git is a control system used for tracking changes in files and that permits reversions to previous states of the files. When a package is registered, Git may be used to track the different revisions of the package, wherein revisions are generated when changes are committed to the files or manifest associated with the package. For example, a modification may be used to modify a YAML file for package 120. Management service 130 may determine whether the modification is permitted, and act based on whether the modification is permitted. When the modification is permitted, management service 330 may update, add, or remove one or more files in repository 111. When the modification is not permitted, any change to the repository 111 will not be implemented. In determining whether a modification is permitted, management service 130 may consult one or more policy files that were provided as part of the package, one or more policy files that are stored and accessible to management service 130, or some other policy file. For example, a user may commit a change in association with CNF package 120. In response to committing the change, management service 130 may determine whether the committed change is permitted based on a policy file included with CNF package 120. When the committed change is not permitted or is not desired based on the policy, management service 130 will not perform any actions in association with the files in repository 111. However, if a modification is permitted, management service 130 may determine how to apply the modification to the CNF files in repository 111 and update at least one file in the second repository based on the committed change. The at least one updated file may then be used in the containers of the computing environment.

Figure 2:
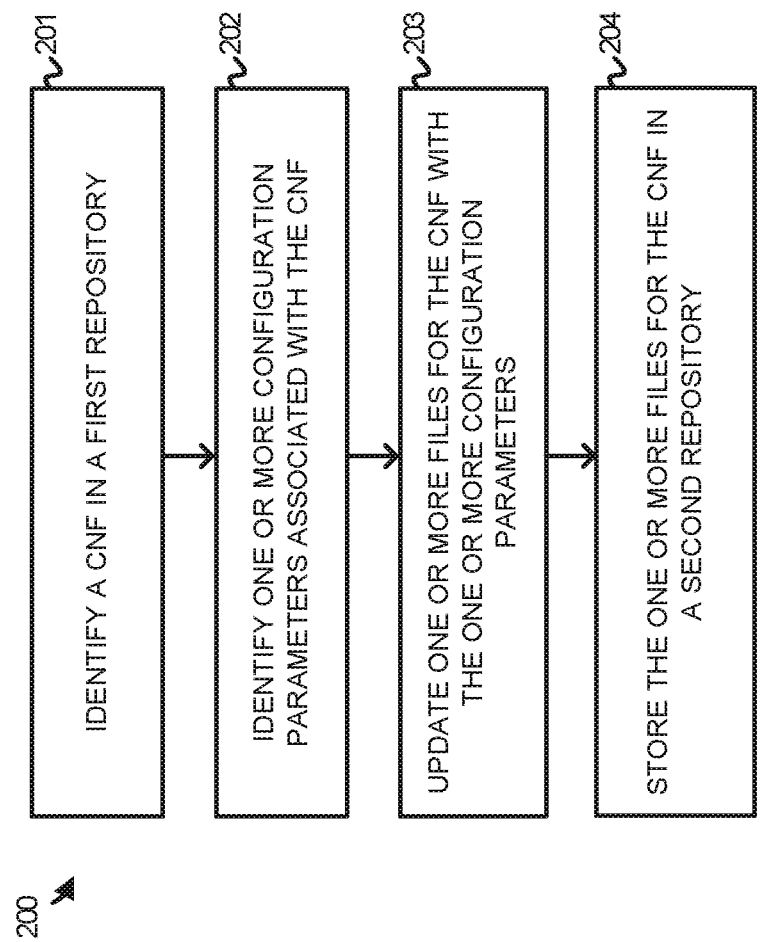
FIG. 2 illustrates an operation of a management service to add a CNF to a deployment environment according to an implementation.

FIG. 2 illustrates an operation 200 of a management service to add a CNF to a deployment environment according to an implementation. The steps of operation 200 are referenced parenthetically in the paragraphs that follow with reference to systems and elements of computing environment 100.

In operation 200, management service 130 will identify (201) a package associated with a CNF in a first repository. In some implementations, the user will provide a path to the CNF, wherein the CNF may comprise a Helm chart in some examples that can include a plurality of configuration files (YAML files) that are packaged as part of a Helm chart. When the path is provided to management service 130 or is registered with management service 130, management service 130 may identify (202) one or more configuration parameters associated with the CNF and update (203) one or more files for the CNF based on the configuration parameters. In some implementations, the configuration parameters will comprise a node selector (referred to as "nodeselector" in Kubernetes) that is used to define requirements for nodes or hosts for deploying the application.

For example, a firewall CNF may be added to the repository 110 and management service 130 may identify that the CNF requires solid-state storage as a requirement for deploying the application. In transforming the CNF, management service 130 may identify requirements associated with the CNF, which may be defined with the CNF itself as metadata, manifests, or the like, and may transform or inject one or more configuration parameters that correspond to the requirements. For example, a CNF package added to repository 110 may indicate that solid-state storage is required for the CNF and management service may transform one or more files associated with the CNF to indicate hosts for the CNFs in a deployment environment. This may include key-value pairs, wherein hosts that match the key-value pairs for a CNF can be identified as capable of hosting the containers for the CNF. In other implementations, management service 130 may identify metadata or manifests associated with the CNF (e.g., information in a file associated with the CNF) and apply configuration parameters 132 based on the metadata. For example, a CNF added to repository 110 may include metadata that indicates processing requirements associated with the CNF. Management service 130 may identify the processing requirements and transform one or more files associated with the CNF to include configuration parameters, such as identifiers for hosts, capable of providing a platform for the CNF package.

After the update is applied to one or more files, operation 200 further stores (204) or makes available the one or more files associated with the CNF in a second repository. In some implementations, the second repository will act a single source of truth for Argo or Flux continuous application deployments (CD), wherein the application deployment may use the second repository as the source of the files to be deployed within the computing environment. Advantageously, management service 130 may identify packages in repository 110 and make the required files available within a downstream repository. Additionally, in some implementations, management service 130 can perform workflow recipes for deploying the various CNF packages, which may include configuration tasks associated with making the CNF available in the cluster and initiating the various processes associated with the CNF. The recipes can be performed before and after the files are made available in the second repository.

Once the files for a CNF are placed in the second repository, the files associated with the CNF can be updated based on changes in the first repository. The changes in the first repository may include adding or removing files, changing dependencies or services, or providing some other modification in association with a CNF. As an example, CNF package 120 is added to repository 110 by providing a path to management service 130 for CNF package 120. In response to receiving the path, management service 130 may transform files associated with the package and place the CNF files 123 in repository 111, wherein repository 111 is used a single source of truth for some application deployment service, such as Flux. After transforming and storing the files, management service 130 may identify modifications to the package and update the files in repository 111 based on the modifications. In some implementations, management service 130 will determine whether the modifications are permitted with the package and apply the modifications to one or more files in repository 111 when the modifications are permitted. Otherwise, management service 130 may prevent an update from being applied when the modifications are not permitted. In determining whether the modifications are permitted, management service 130 may identify policies that can be provided as part of the CNF package, can be provided by an administrator associated with management service 130, or can be provided via some other means. For example, a policy file in CNF package 120 may indicate that one or more files cannot be removed. Accordingly, if a modification were made to the CNF package that removed one of the files, management service 130 may determine that the modification is not permitted and may prevent the modification from being applied to one or more files in repository 111.

Figure 3:
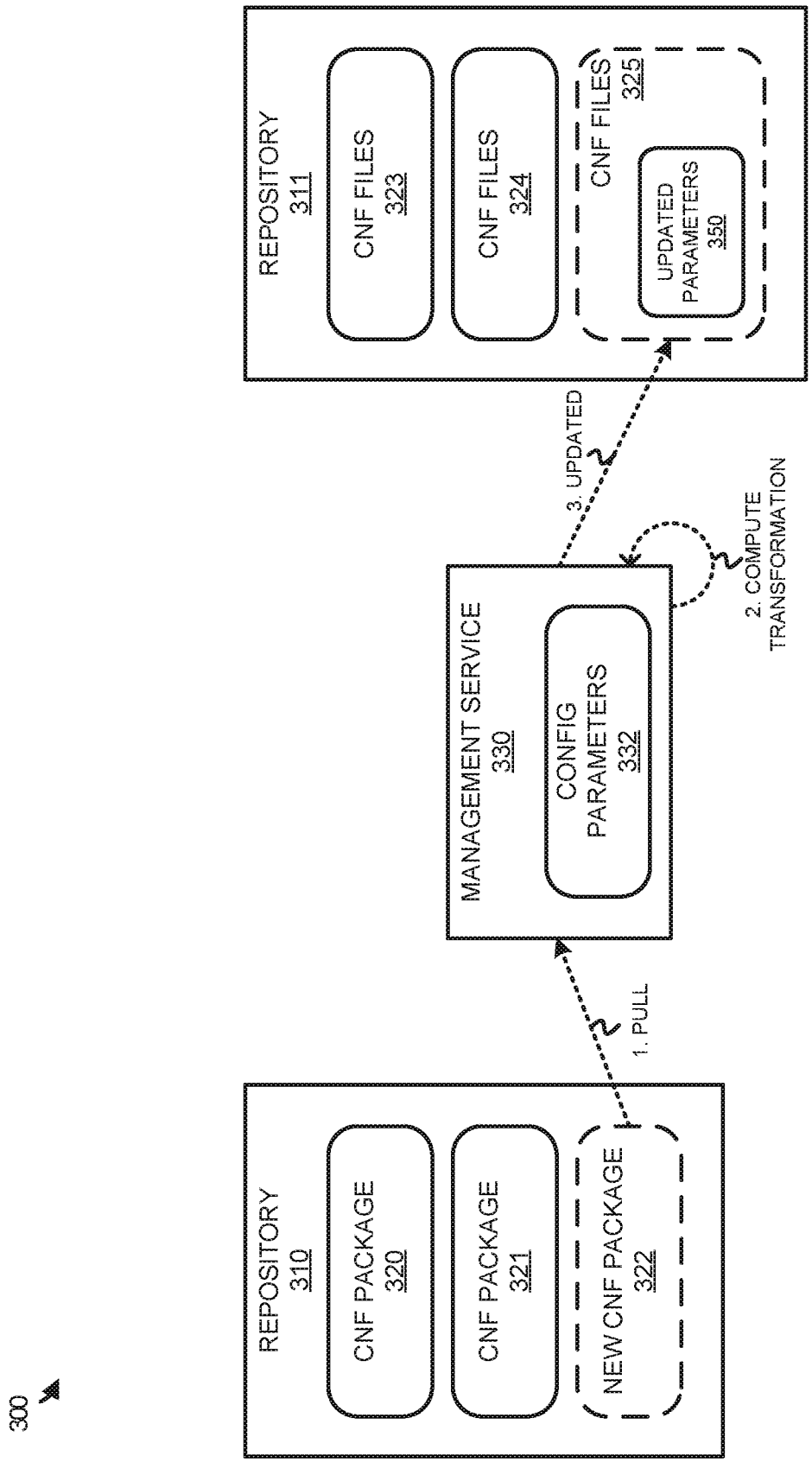
FIG. 3 illustrates an operational scenario of adding a CNF to a deployment environment according to an implementation.

FIG. 3 illustrates an operational scenario 300 of adding a CNF to a deployment environment according to an implementation. Operational scenario 300 includes repositories 310-311 and management service 330. Repository 310 includes CNF packages 320-322 that are representative of Helm Charts for CNFs to be deployed in an environment. Repository 311 includes CNF files 323-325 that correspond to transformed and updated files associated with CNF packages 320-322. Management service 330 includes configuration parameters 332.

In operational scenario 310, management service 330 may identify the registration of a CNF package 322 that corresponds to a CNF to be deployed within a deployment environment. The deployment environment may include physical computing systems capable of providing a platform for the containers corresponding to the CNF. In some implementations, a user will register a path to the CNF, wherein the path can be used by management service 330 to pull the original CNF package, provide any required transformations on files associated with the CNF package, and store the transformed files in the files of repository 311. Repository 311 may represent a single source of truth for implementing the CNF within the deployment environment, wherein a continuous delivery service (such as Flux, Argo, or some other continuous delivery service) may identify changes in the files of repository 311 and update the deployments of the CNF in the deployment environment.

Here, a user provides a path for new CNF package 322 to management service 330, wherein the path may comprise a file path to access CNF package 322 in repository 310. Once the path is provided, management service 330 may pull at step 1, new CNF package 322 and compute a transformation for one or more files associated with the CNF package at step 2. The transformation may be used to provide a nodeselector, wherein the nodeselector may comprise key-value pair that identifies requirements associated with the CNF. In at least one implementation, the nodeselector may be used to indicate requirements associated with deploying the CNF within a deployment environment. The requirements may include processing resource requirements, storage resource requirements or some other requirement. When new CNF package 322 is added, the management service 330 may identify the type of CNF being added, notes or other information provided with the new CNF package, or some other information associated with the package. Management service 330 may then use this information and configuration parameters 332 to generate updated parameters 350. Updated parameters 350 can then be used in deploying the CNF to select resources, such as hosts, capable of supporting the containers and/or pod for the CNF. Although demonstrated as updating the nodeselector, other updates prior to storing the CNF files in repository 311 may include injecting autoscaler information for a deployment or a stateful set, wherein the autoscaler may be used as an injected value to scale based on requirements in the deployment environment. This information may be used by Flux or some other continuous deployment mechanism to deploy the CNF as one or more containers in an environment. Once the transformation is complete, CNF files 325 corresponding to new CNF package 322 are made available with updated parameters 350.

Once the CNF files 325 are made available in repository 311 with updated parameters, the CNF may be deployed as one or more containers in the environment. Management service 330 may then monitor repository 310 for changes to CNF package 322, wherein the modifications may include changing dependencies, updating available charts, modifying manifests, or providing some other modification. Management service 330 may then determine what modifications are permitted to the CNF package and apply the modifications to one or more files in repository 311. The modifications may include adding one or more files, removing one or more files, or providing some other modification in association with one or more files for a CNF package.

Figure 4:
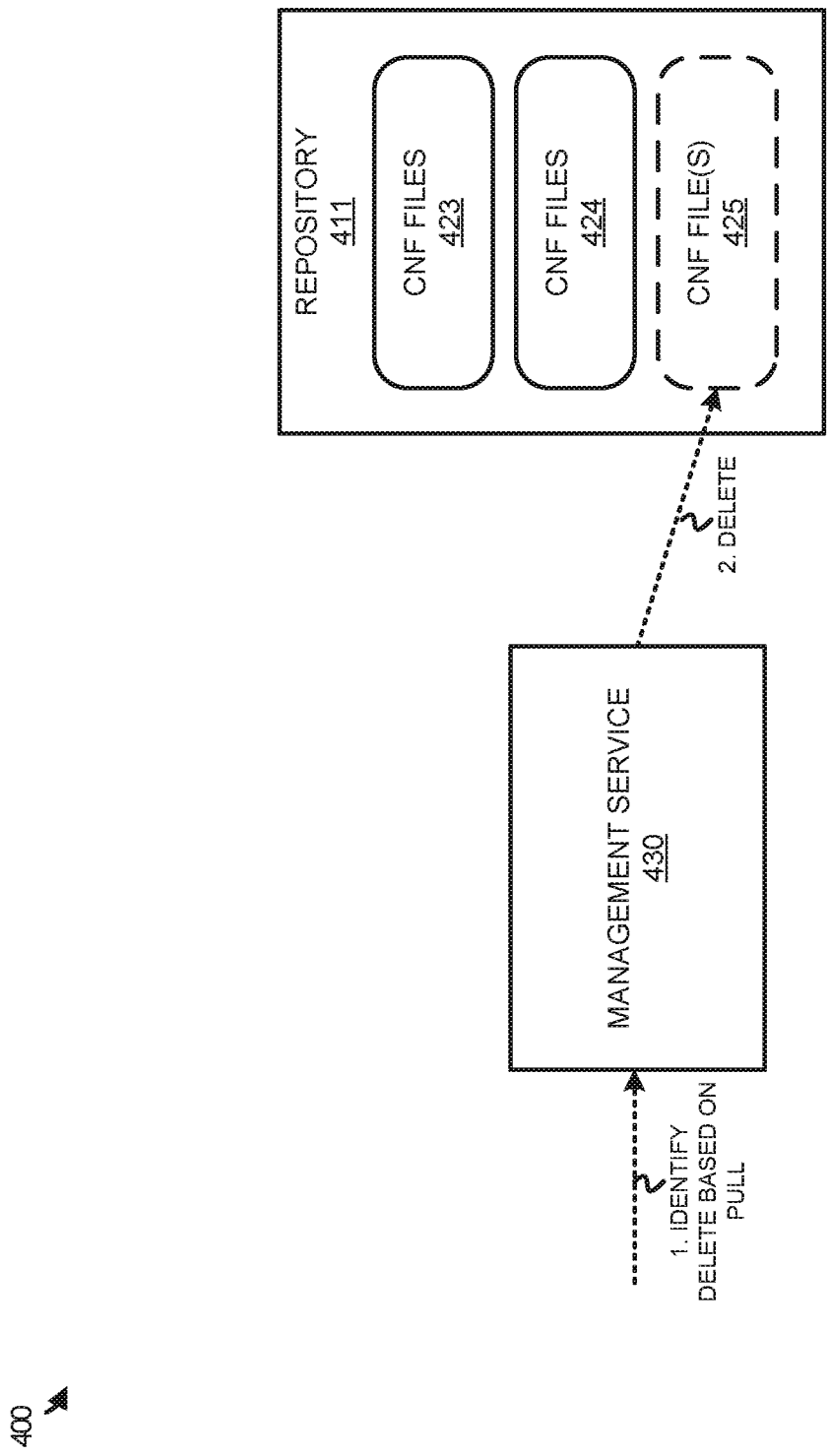
FIG. 4 illustrates an operational scenario of deleting CNF files in a computing environment according to an implementation.

FIG. 4 illustrates an operational scenario 400 of deleting CNF files in a computing environment according to an implementation. Operational scenario includes management service 430 and repository 411 with CNF files 423-425. Repository 411 is representative of a downstream repository for files associated with CNFs, wherein the files may be stored and accessible to Flux, Algo, or some application deployment mechanism or GitOps operator. The GitOps operator may be used to identify changes within the files and applies the changes to the live infrastructure or live deployments of the CNF.

As described herein, when a new CNF package is made available in a first repository, management service 430 may identify the path to the CNF package, implement any required transformations on the files of the package, and make the files accessible within repository 411. The files available in repository 411 may include any files associated with a Helm chart source, wherein the files can include YAML files, resource manifests, or hooks. The transformations may include updating or injecting information into the template files, such that the CNF can be implemented in the local environment. The injection may include adding information about node selection, adding information associated with autoscaler or scaling out the CNF in the deployment environment, or providing some other modification in association with the files for the CNF package.

After files associated with a package are added to repository 411, management service 430 may pull the CNF package periodically, pay pull the CNF package periodically, may pull the CNF package when a modification is committed to the CNF package via GIT, or at some other interval. When the package is pulled, management service 430 may determine whether any modifications were made to the CNF package and update repository 411 based on the modification. The modification may include adding or removing dependencies, replacing one or more files in the package, or providing some other modification.

In some implementations, when a modification is made to a CNF package, management service 430 will determine whether the modification is permitted to be applied to the files in repository 411. In determining whether the modification is permitted, management service 430 may determine whether the user associated with the modification is permitted to make the modification, determine whether the modification is permitted based on one or more policy files associated with the CNF, or based on some other factor. In the example when the modification is not permitted, management service 430 may prevent the update to one or more files in repository 411. In contrast when the modification is permitted, management service 430 may permit the update to one or more files in repository 411. The update may be used to update one or more files, add one or more files, replace one or more files, or provide some other modification in association with one or more files for the CNF.

Here, in operational scenario 400, management service 430 identifies a modification, at step 1, to a file in a CNF package based on a pull from the CNF package, wherein the modification corresponds to deleting a file in repository 411. In response to identifying the modification, management service 430 may determine whether the modification is permitted and, when permitted, delete one or more files 425 from repository 411 at step 2. Once the files are removed the GitOps operator and update any live instances of the CNF based on the deletion of the one or more files.

Figure 5:
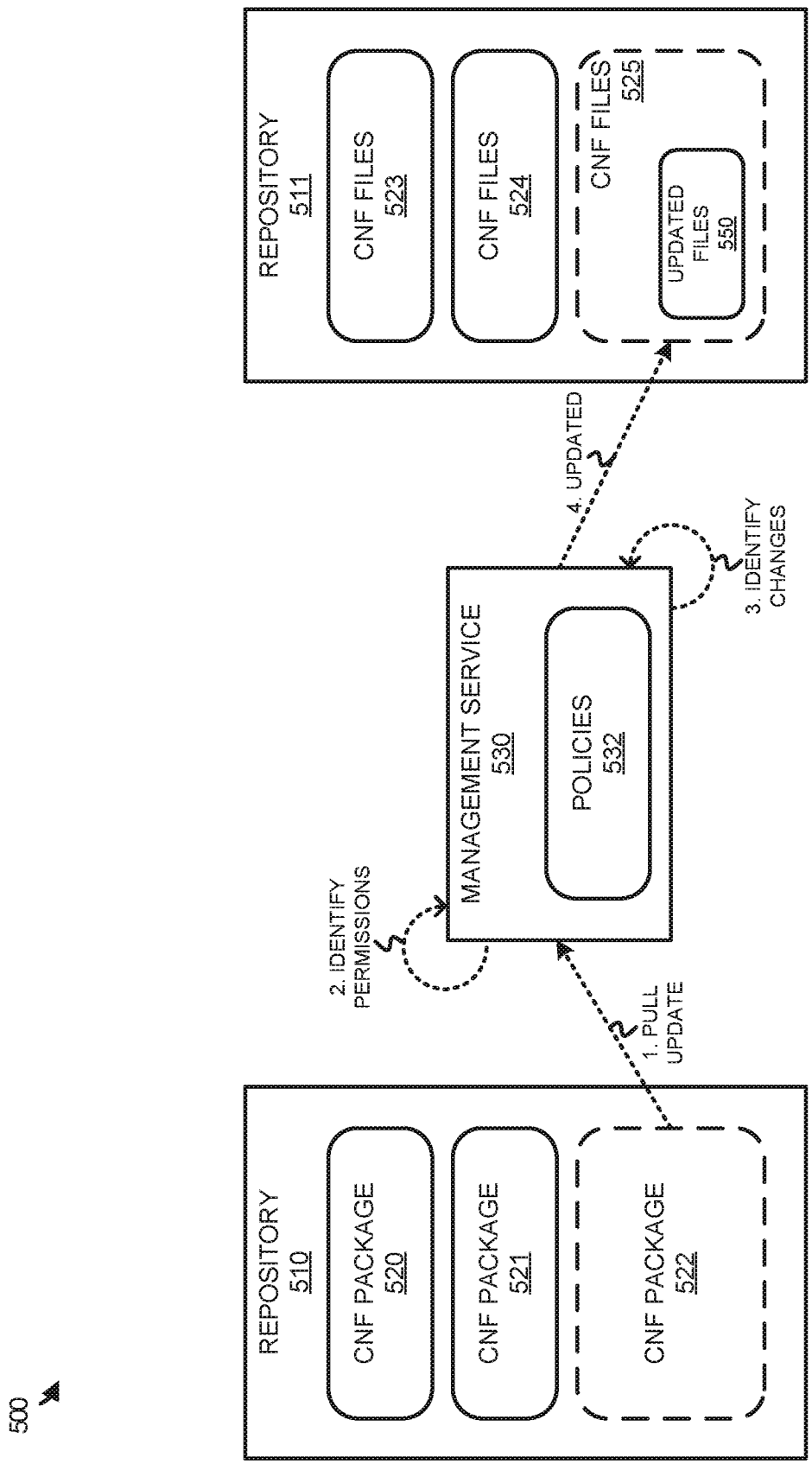
FIG. 5 illustrates an operational scenario of committing changes to a CNF package according to an implementation.

FIG. 5 illustrates an operational scenario 500 of committing changes to a CNF package according to an implementation. Operational scenario 500 includes repositories 510-511 and management service 530. Repository 510 further includes CNF packages 520-522 and repository 511 further includes CNF files 523-525 that correspond to CNF packages 520-522. Management service 530 further includes policies 532 that are used to determine whether a modification is permitted to a CNF package. The policies may be defined by an administrator, defined by policy file associated with the package, or defined in some other manner. For example, a policy file may indicate files or portions of files that cannot be modified.

In operational scenario 500, CNF packages 520-522 are added to upstream repository 510, wherein a user may provide a path to each of the packages to join repository 510. When a CNF package is added, management service 530 may perform transformations if required on one or more files for the CNF, and place the files associated with the CNF in repository 511. For example, when CNF package 520 is added to repository 510, management service 530 may perform one or more transformations on files associated with the CNF package and add CNF files 523 to repository 511. These files can then be used as a single source of truth for an application deployment service or GitOps service that manages the synchronization of the Kubernetes clusters with using the files in the repository.

Here, after CNF package 522 is added to repository 510, an update is generated in association with the package. The update may comprise modifying one or more YAMLs, manifests, or some other modification. The modification may include changing an existing file, adding an existing file, removing an existing file, or some other operation. Management service 530 pulls, at step 1, the update to the CNF package. In some implementations, the modifications to CNF package 522 will be made using Git, wherein a management service 530 may periodically or at some other intervals monitor the committed changes to the branch of the CNF package.

Once a modification is made to the CNF package, which may comprise a modification to the CNF component section or a change to a file, management service 530 may identify policies 532 associated with CNF package 522 to determine whether the modification is permitted at step 2. In some implementations, the policies will be defined in association with the package (defined in a policy file for the package), wherein the policies may indicate files or parameters that are not available to be modified by a developer. When a modification is not permitted based on the policy files, management service 530 may prevent and changes to be made in repository 511. Accordingly, even if a modification is made in repository 510, the single source of truth for the GitOps service will not identify the modification.

However, if the modification is approved, management service 530 will identify changes to one or more files based on the modification at step 3. The changes to the one or more files may include adding one or more files, removing one or more files, updating one or more files, or providing some other operation. Once the changes are identified, the updated files are pushed to repository 511 as updated files 550 at step 4, wherein a GitOps service may use the updated files for containers and clusters associated with the CNF.

Figure 6:
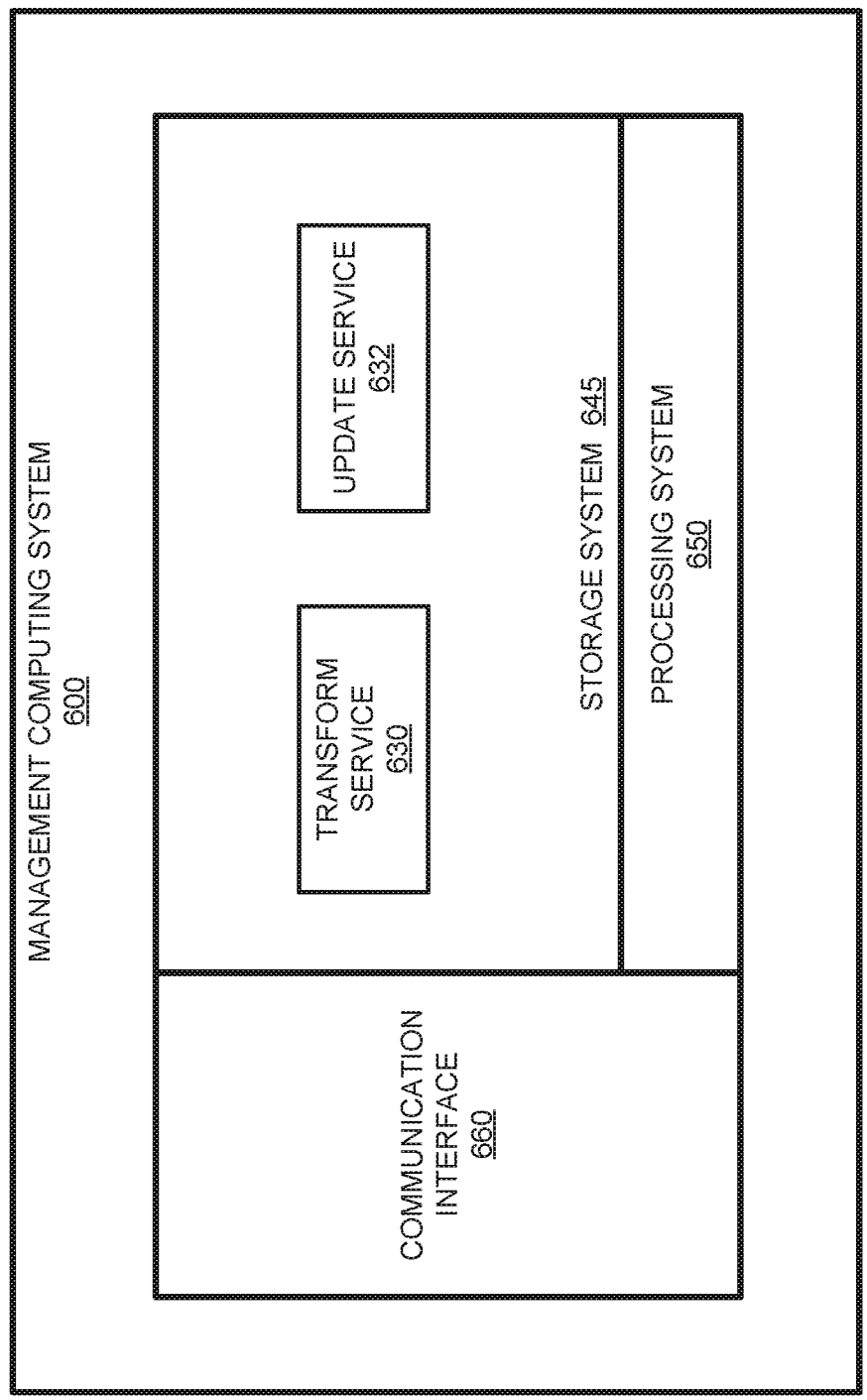
FIG. 6 illustrates a management computing system to manage versions of CNFs according to an implementation.

FIG. 6 illustrates a management computing system 600 to manage versions of CNFs according to an implementation. Computing system 600 is representative of any computing system or systems with which the various operational architectures, processes, scenarios, and sequences disclosed herein for a management service can be implemented. Computing system 600 is an example of a management service 130 of FIG. 1, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with one or more computing systems that provide repositories for CNF files and packages.

Processing system 650 comprises microprocessor and other circuitry that retrieves and executes operating software from storage system 645. Storage system 645 may include volatile and nonvolatile, removable, and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises transform service 630 and update service 632. The operating software on storage system 645 may further include an operating system, utilities, drivers, network interfaces, applications, or some other type of software. When read and executed by processing system 650 the operating software on storage system 645 directs computing system 600 to operate as described herein. In at least one example, the operating software can provide at least operation 200 of FIG. 2 and the updating operations described in FIGS. 3-5.

In at least one implementation, transform service 630 directs processing system 650 to identify a new CNF in a first repository, wherein the CNF may comprise a plurality of files, include descriptor files, YAML files, manifests, workflow recipes, or some other file. In some implementations, a developer will provide transform service 632 with a path to the files for the CNF in the first repository. In response to identifying the new CNF, transform service 630 directs processing system 650 to identify one or more configuration parameters associated with the CNF and update one or more files for the new CNF with the one or more configuration parameters. The configuration parameters may include node selector information to select hosts with specific attributes, scale out parameter, or some other parameter. In some implementations, the CNF itself will identify requirements, such as processing requirements, and transform service 630 may transform a parameter in a file to correspond to the deployment environment. For example, a configuration file for the CNF may indicate that solid-state storage is required for the CNF deployment, transform service 630 may identify this requirement and update one or more files with a parameter that identifies hosts capable of supporting the CNF. In other implementations, an administrator may define parameters for deploying different type CNFs, wherein transform service 630 may identify the type of CNF that is added and update one or parameters based on the type. Once the one or more files are updated, the one or more updated files and other files may be stored in the second repository, wherein the second repository may comprise a single source of truth for an application deployment service. In some implementations, transform service 630 will further perform any pre-instantiated workflows and any post-instantiated workflows when the files are stored in the second repository.

Update service 630 directs processing system 650 to identify a committed change in one or more files associated with a CNF in a first repository. Once a committed change is made, which may include updating one or more files, adding one or more files, or removing one or more files, update service 630 directs processing system 650 to determine whether the committed change is permitted based on one or more policies associated with the CNF. In some examples, each CNF may include or be associated with a policy that can indicate files or portions of files that cannot be modified by a developer. Accordingly, if a modification is not permitted based on the policy, the modification will not be implemented in the downstream repository. However, if the modification is permitted, update service may update one or more files in the second repository based on the committed change. The update may include adding, removing, replacing, or some other operation to implement the modification.

In some examples, in addition to or in place of using the policy file to determine whether a modification is permitted, update service 632 may determine whether a modification is permitted based on the developer committing the change. For example, a developer may commit a modification to the file associated with a CNF. When the modification is identified in the first repository, update service 632 may identify a developer associated with the committed modification and determine whether the developer is permitted to make the modification based on one or more policy rules.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
identifying a committed change in one or more files associated with a cloud-native network function (CNF) in a first repository;
determining whether the committed change is permitted based on one or more policies associated with the CNF; and
when the committed change is permitted, updating at least one file in a second repository based on the committed change, wherein the second repository provides a single source of truth for deploying the CNF, a change in the second repository being relied upon for updating deployments of the CNF, the change in the second repository includes an updated parameter associated with a requirement for deploying the CNF.

2. The method of claim 1, wherein the committed change comprises a change to one or more YAML files.

3. The method of claim 1, wherein the CNF in the first repository comprises a plurality of files and a manifest.

4. The method of claim 1, wherein the CNF comprises a firewall function or routing function.

5. The method of claim 1 further comprising:
when the committed change is not permitted, preventing an update to at least one file in the second repository.

6. The method of claim 1 further comprising:
identifying a new CNF in the first repository;
identifying one or more configuration parameters associated with the CNF;
updating one or more files for the new CNF with the one or more configuration parameters; and
storing the one or more files for the new CNF in the second repository.

7. The method of claim 6, wherein the one or more configuration parameters comprise at least a node selector parameter.

8. The method of claim 1, wherein determining whether the committed change is permitted based on the one or more policies associated with the CNF comprises:
identifying a file associated with the committed change;
determining whether the file is permitted to be modified based on the one or more policies; and
when the file is permitted to be modified, permitting the committed change.

9. A computing apparatus comprising:
a storage system;
a processing system operatively coupled to the storage system; and
program instructions stored on the storage system that, when executed by the processing system, direct the computing apparatus to:
identify a committed change in one or more files associated with a cloud-native network function (CNF) in a first repository;
determine whether the committed change is permitted based on one or more policies associated with the CNF; and
when the committed change is permitted, update at least one file in a second repository based on the committed change, wherein the second repository provides a single source of truth for deploying the CNF, files stored in the second repository being relied upon for a synchronization of Kubernetes clusters, a change in the second repository being relied upon for updating deployments of the CNF, the change in the second repository includes an updated parameter associated with a requirement for deploying the CNF.

10. The computing apparatus of claim 9, wherein the committed change comprises a change to one or more YAML files.

11. The computing apparatus of claim 9, wherein the CNF in the first repository comprises a plurality of files and a manifest.

12. The computing apparatus of claim 9, wherein updating at least one file in the second repository based on the committed change comprises adding at least one file in the second repository based on the committed change.

13. The computing apparatus of claim 9, wherein the program instructions further direct the computing apparatus to:
when the committed change is not permitted, prevent an update to at least one file in the second repository.

14. The computing apparatus of claim 9, wherein the program instructions further direct the computing apparatus to:
identify a new CNF in the first repository;
identify one or more configuration parameters associated with the CNF;
update one or more files for the new CNF with the one or more configuration parameters; and
store the one or more files for the new CNF in the second repository.

15. The computing apparatus of claim 14, wherein the one or more configuration parameters comprise at least a node selector parameter.

16. The computing apparatus of claim 9, wherein determining whether the committed change is permitted based on the one or more policies associated with the CNF comprises:
identifying a file associated with the committed change;
determining whether the file is permitted to be modified based on the one or more policies; and
when the file is permitted to be modified, permitting the committed change.

17. The computing apparatus of claim 9, wherein determining whether the committed change is permitted comprises determining whether a user associated with the committed change is permitted to make the committed change.

18. An apparatus comprising:
a storage system;
program instructions stored on the storage system that, when executed by a processing system, directs a computing apparatus to:
identify a cloud-native network function (CNF) in a first repository;
identify one or more configuration parameters associated with the CNF;
update the one or more files for the CNF with the one or more configuration parameters;
store the one or more files for the CNF in the second repository;
wherein an unpermitted modification to the CNF in the first repository is not identified by the second repository, second repository being relied upon for updating deployments of the CNF, a change in the second repository includes an updated parameter associated with a requirement for deploying the CNF.

19. The apparatus of claim 18, wherein the one or more configuration parameters comprise at least a node selector parameter associated with a CNF type for the CNF.

20. The method of claim 1, wherein the requirement comprises a processing resource requirement or a storage resource requirement.

\* \* \* \* \*